(12) United States Patent
Yu

(10) Patent No.: US 7,631,044 B2
(45) Date of Patent: Dec. 8, 2009

(54) SUPPRESSION OF UNDESIRABLE NETWORK MESSAGES

(75) Inventor: Tony Yu, Hillsborough, CA (US)

(73) Assignee: GoZoom.com, Inc., San Francisco, CA (US)

( * ) Notice: Subject to any disclaimer, the term of this patent is extended or adjusted under 35 U.S.C. 154(b) by 852 days.

(21) Appl. No.: 11/077,384

(22) Filed: Mar. 9, 2005

(65) Prior Publication Data

US 2005/0246440 A1   Nov. 3, 2005

Related U.S. Application Data

(60) Provisional application No. 60/551,959, filed on Mar. 9, 2004.

(51) Int. Cl.
*G06F 15/16* (2006.01)

(52) U.S. Cl. ............... 709/206; 709/202; 709/203; 709/207; 709/224; 709/225; 455/414.1

(58) Field of Classification Search ......... 709/202–203, 709/206–207, 223–226; 726/11–14; 455/414.1
See application file for complete search history.

(56) References Cited

U.S. PATENT DOCUMENTS

| | | | |
|---|---|---|---|
| 5,694,616 A | 12/1997 | Johnson et al. |
| 5,742,769 A | 4/1998 | Lee et al. |
| 5,781,857 A | 7/1998 | Hwang et al. |
| 5,809,020 A | 9/1998 | Bruckert et al. |
| 5,822,526 A | 10/1998 | Waskiewicz |
| 5,878,230 A | 3/1999 | Weber et al. |
| 5,978,799 A | 11/1999 | Hirsch |
| 5,987,609 A | 11/1999 | Hasebe |
| 5,999,967 A | 12/1999 | Sundsted |
| 6,023,723 A | 2/2000 | McCormick et al. |
| 6,052,709 A | 4/2000 | Paul |
| 6,104,500 A | 8/2000 | Alam et al. |
| 6,108,688 A | 8/2000 | Nielsen |
| 6,108,691 A | 8/2000 | Lee et al. |
| 6,118,856 A | 9/2000 | Paarsmarkt et al. |
| 6,141,695 A | 10/2000 | Sekiguchi et al. |
| 6,161,130 A | 12/2000 | Horvitz et al. |
| 6,199,103 B1 | 3/2001 | Sakaguchi et al. |

(Continued)

OTHER PUBLICATIONS

Graham-Cumming, John; *Welcome to POPFile*; SourchForge.net; © 2001-2004; pp. 1-5; @http://popfile.sourchforgenet/old_index.html.

(Continued)

*Primary Examiner*—Bharat N Barot
(74) *Attorney, Agent, or Firm*—Fliesler Meyer LLP

(57) ABSTRACT

A system for suppressing delivery of undesirable messages through vulnerable systems. The system includes an emulator that emulates one or more of the vulnerable systems. A module associated with the emulator intercepts undesirable messages, which were originally intended to be sent through a vulnerable system. One embodiment includes plural emulators, which include one or more servers that are part of a network of servers. A controller communicates with one or more servers. In this embodiment, the controller includes a database capable of storing statistics pertaining to undesirable messages blocked by one or more of the servers. The statistics may include information pertaining to the sender(s) of the undesirable messages. Undesirable messages intercepted by the network of servers include email spam.

42 Claims, 3 Drawing Sheets

U.S. PATENT DOCUMENTS

| | | | |
|---|---|---|---|
| 6,223,213 B1 | 4/2001 | Cleron et al. | |
| 6,249,807 B1 | 6/2001 | Shaw et al. | |
| 6,272,532 B1 | 8/2001 | Feinleib | |
| 6,282,565 B1 | 8/2001 | Shaw et al. | |
| 6,289,214 B1 | 9/2001 | Backstrom | |
| 6,304,898 B1 | 10/2001 | Shiigi | |
| 6,321,267 B1 | 11/2001 | Donaldson | |
| 6,324,569 B1 | 11/2001 | Ogilvie et al. | |
| 6,330,589 B1 | 12/2001 | Kennedy | |
| 6,330,590 B1 | 12/2001 | Cotten | |
| 6,351,523 B1 | 2/2002 | Detlef | |
| 6,363,414 B1 | 3/2002 | Nicholls et al. | |
| 6,374,292 B1 | 4/2002 | Srivastava et al. | |
| 6,401,112 B1 | 6/2002 | Boyer et al. | |
| 6,405,225 B1 | 6/2002 | Apfel et al. | |
| 6,405,243 B1 | 6/2002 | Nielson | |
| 6,413,000 B1 | 7/2002 | Borcherds et al. | |
| 6,421,709 B1 | 7/2002 | McCormick | |
| 6,424,426 B1 | 7/2002 | Henry | |
| 6,438,584 B1 | 8/2002 | Powers | |
| 6,443,841 B1 | 9/2002 | Rossides | |
| 6,446,115 B2 | 9/2002 | Powers | |
| 6,446,261 B1 | 9/2002 | Rosser | |
| 6,460,075 B2 | 10/2002 | Krueger et al. | |
| 6,473,812 B2 | 10/2002 | Motoyama | |
| 6,487,586 B2 | 11/2002 | Ogilvie et al. | |
| 6,502,127 B1 | 12/2002 | Edwards et al. | |
| 6,522,421 B2 | 2/2003 | Chapman et al. | |
| 6,526,042 B1 | 2/2003 | Pinard et al. | |
| 6,529,908 B1 | 3/2003 | Piett et al. | |
| 6,539,385 B1 | 3/2003 | Pollack et al. | |
| 6,546,416 B1 | 4/2003 | Kirsch | |
| 6,546,417 B1 | 4/2003 | Baker | |
| 6,580,787 B1 | 6/2003 | Akhteruzzaman et al. | |
| 6,587,871 B1 | 7/2003 | Schrader | |
| 6,591,296 B1 | 7/2003 | Ghanime | |
| 6,592,627 B1 | 7/2003 | Agrawal et al. | |
| 6,600,750 B1 | 7/2003 | Joffe et al. | |
| 6,614,551 B1 | 9/2003 | Peek | |
| 6,615,241 B1 | 9/2003 | Miller et al. | |
| 6,643,687 B1 | 11/2003 | Dickie et al. | |
| 6,651,879 B2 | 11/2003 | Lapstun et al. | |
| 6,654,787 B1 | 11/2003 | Aronson et al. | |
| 6,671,718 B1 | 12/2003 | Meister et al. | |
| 6,684,088 B1 | 1/2004 | Halahmi | |
| 6,684,238 B1 | 1/2004 | Dutta | |
| 6,691,156 B1 * | 2/2004 | Drummond et al. | 709/206 |
| 6,732,157 B1 | 5/2004 | Gordon et al. | |
| 6,779,021 B1 * | 8/2004 | Bates et al. | 709/206 |
| 6,842,773 B1 | 1/2005 | Ralston et al. | |
| 6,868,498 B1 * | 3/2005 | Katsikas | 726/14 |
| 7,194,515 B2 | 3/2007 | Kirsch | |
| 7,194,681 B1 | 3/2007 | Horvitz | |
| 7,206,814 B2 | 4/2007 | Kirsch | |
| 7,219,148 B2 | 5/2007 | Rounthwaite et al. | |
| 7,239,866 B2 * | 7/2007 | Cai et al. | 455/414.1 |
| 7,249,162 B2 | 7/2007 | Rounthwaite et al. | |
| 7,249,175 B1 * | 7/2007 | Donaldson | 709/225 |
| 7,272,853 B2 * | 9/2007 | Goodman et al. | 726/13 |
| 7,287,060 B1 * | 10/2007 | McCown et al. | 709/206 |
| 7,299,261 B1 | 11/2007 | Oliver et al. | |
| 7,353,539 B2 * | 4/2008 | Brawn et al. | 709/224 |
| 7,389,413 B2 * | 6/2008 | Bandini et al. | 713/153 |
| 7,406,502 B1 | 7/2008 | Oliver et al. | |
| 7,412,723 B2 * | 8/2008 | Blake et al. | 709/224 |
| 2002/0103914 A1 | 8/2002 | Dutta et al. | |
| 2003/0069936 A1 | 4/2003 | Warner et al. | |
| 2003/0158725 A1 | 8/2003 | Woods | |
| 2003/0212745 A1 | 11/2003 | Caughey | |
| 2004/0039786 A1 | 2/2004 | Horvitz | |
| 2004/0087300 A1 | 5/2004 | Lewis | |
| 2004/0093384 A1 | 5/2004 | Shipp | |
| 2004/0107386 A1 | 6/2004 | Burdick et al. | |
| 2004/0260776 A1 | 12/2004 | Starbuck et al. | |
| 2005/0060643 A1 | 3/2005 | Glass et al. | |
| 2005/0080860 A1 | 4/2005 | Daniell et al. | |
| 2005/0097179 A1 * | 5/2005 | Orme | 709/207 |
| 2005/0193073 A1 | 9/2005 | Mehr et al. | |

OTHER PUBLICATIONS

Yerzunis et al.; *Spam Conference 2005 Abstracts*; pp. 1-14; @http://spamconference.org/abstracts.html.

Ahmed et al.; *Word Stemming to Enhance Spam Filtering*; Department of Computer Science & Engineering, University of Dhaka, Bangladesh; pp. 1-2.

Moore, et al.; Mailshell, the OEM Anti-Spam Leader; http://www.mailshell.com/mail/client/oem2.html/step/ip.

Graham, Paul, "A Plan for Spam," Aug. 2002, 8 pages http://paulgraham.com/spam.html.

Oudot, Laurent, "Fighting Spammers with Honeypots: Parts 1 and 2," Nov. 26, 2003, 15 pages.

Sahami, Mehran, et al., "A Bayesian Approach to Filtering Junk E-Mail," AAA'98 Workshop on Learning for Text Categorization, Jul. 27, 1998, Madison, WI, 8 pages.

Wallace, Shawn, "Programming Web Graphics with Perl and GNU Software," O'Reilly Media, Feb. 1, 1999, pp. 1-5.

* cited by examiner

US 7,631,044 B2

SUPPRESSION OF UNDESIRABLE NETWORK MESSAGES

CLAIM OF PRIORITY

This invention claims priority from U.S. Provisional Patent Application Ser. No. 60/551,959 filed on Mar. 9, 2004 which is hereby incorporated by reference as if set forth in full in this specification.

BACKGROUND OF THE INVENTION

This invention is related in general to processing of digital information and more specifically to systems and methods for detecting, inhibiting, and/or suppressing delivery of undesirable network messages.

Systems for monitoring and controlling network messages are employed in various demanding applications including antivirus, spyware-blocking, and antispam applications. Such applications demand vigilant systems that can detect and block undesirable network messages, which may contain viruses, spyware, or unwanted or illegal advertising, such as undesired email solicitations (spam).

Systems for reliably suppressing spam are particularly important. Spam is becoming increasingly pervasive, clogging Internet bandwidth, and pestering Internet users. Unfortunately, conventional antispam systems are often readily detectable and avoidable by spam senders (spammers). Furthermore, such conventional systems often cannot detect, locate, or otherwise identify spammers. Consequently, spammers remain relatively free to continue anonymously sending undesirable or illegal network messages.

SUMMARY OF EMBODIMENTS OF THE INVENTION

One embodiment of the present invention provides a system for suppressing delivery of undesirable messages through vulnerable systems, such as open relays, exploitable web page forms, virus-infected computers, and so on. The system includes an emulator that emulates one or more of the vulnerable systems. A module associated with the emulator intercepts undesirable messages.

Another embodiment further includes plural emulators, which include one or more servers that are part of a network of servers. A controller communicates with one or more servers. The controller includes a database capable of storing statistics pertaining to undesirable messages blocked by one or more of the servers. The statistics may include information pertaining to the sender of the undesirable messages. Undesirable messages intercepted by the network of servers may include email spam.

In another embodiment, the emulator further includes a response-time emulation mechanism that adjusts emulator response times for received messages based on the lengths or sizes of the received messages. The emulator further includes a command-delivery limiter that limits sending rates or delivery intervals of predetermined commands bound for a target email server to optimize emulator transparency. The predetermined commands may include RCPT and VRFY Simple Mail Transport Protocol (SMPT) commands. Another mechanism selectively further delays messages sent by the emulator in response to intercepted email communications, thereby further slowing the system associated with the sender of the undesirable messages.

One embodiment further includes a message deletion/archiving module capable of deleting, archiving, or forwarding intercepted messages. An additional mode-selection module communicates with a user interface to facilitate switching emulation modes of the associated emulator. Emulation modes include open proxy emulation, open relay emulation, virus or worm-infected system emulation, and/or vulnerable web form emulation.

Various embodiments of the present invention effectively emulate exploitable or otherwise vulnerable systems that would ordinarily be employed to relay undesirable network messages, such as spam. Such embodiments act as traps, which inhibit the delivery of undesirable messages to their originally intended destinations while extracting information about the sender of the messages, such as address, physical location, and message-sending statistics. This extracted information may be employed by law enforcement or other entities to further suppress the delivery of undesirable messages.

DETAILED DESCRIPTION OF EMBODIMENTS OF THE INVENTION

For clarity, various well-known components, such as power supplies, communications ports, routers, gateways, firewalls, and so on, have been omitted from the figures. However, those skilled in the art with access to the present teachings will know which components to implement and how to implement them to meet the needs of a given application.

Figure 1:
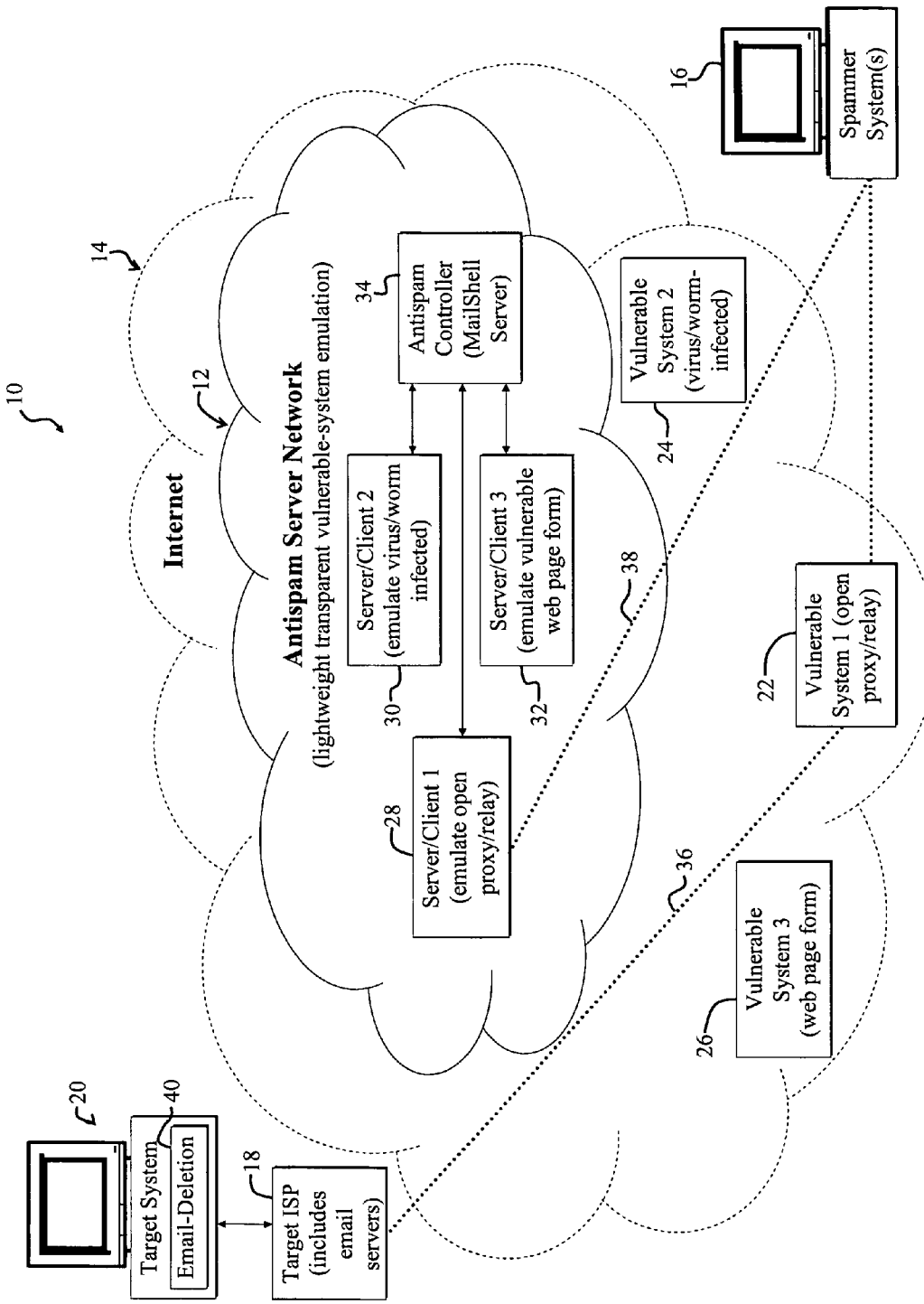
FIG. 1 is a diagram of a system for suppressing undesirable network messages according to an embodiment of the present invention.

FIG. 1 is a diagram illustrating a system 10 for suppressing undesirable electronic messages according to an embodiment of the present invention. The system 10 includes an antispam server network 12, which is part of the Internet 14. For illustrative purposes, a spammer system 16, which connects to the Internet 14, is shown. A target Internet Service Provider (ISP) 18, which also connects to the Internet 14, communicates with a target system 20. In the present illustrative scenario, the target system 20 is the intended recipient of spam messages sent via the spammer system 16.

For the purposes of the present discussion, spam is any unsolicited electronic message that the user of the target system 20 does not wish to receive or is otherwise considered undesirable or illegal by the user of the target system 20. An undesirable message is any message that may cause harm to a recipient or associated network or is otherwise unsolicited or unwanted by the intended recipient of the message. Undesirable messages, such as spam, often include electronic solicitations.

A vulnerable system includes a system, such as an open relay, open proxy, or other system that may be employed or otherwise exploited to facilitate relaying, forwarding, or otherwise sending a message. Vulnerable systems are often employed to facilitate disguising the identity of the original sender of the message. Vulnerable systems are often associated with exploitable computers. A computer includes any processor in communication with a memory. Other types of systems include consumer electronic devices such as a personal digital assistant (PDA), mobile phone, mp3 or audio player, camera, etc. In general, any type of device that allows communication with other devices, such as over a network (e.g., the Internet) might be adapted for use with the invention.

An open proxy can be a server or other device that automatically forwards Internet connections from one place to another. Accordingly, a spammer may employ vulnerable systems, such as open proxies to relay spam. Unfortunately, open proxies often do not maintain information sufficient to track and prosecute spammers employing the open proxies.

For illustrative purposes, various types of vulnerable systems, including a first vulnerable system 22, a second vulnerable system 24, and a third vulnerable system 26 are shown on the Internet 14. In the present exemplary scenario, the vulnerable systems 22, 24, 26 correspond to an open proxy/relay system 22, a virus/worm-infected system 24, and a vulnerable web page form 26, respectively. The systems 22, 24, 26 are vulnerable to being used by the spammer 16 to relay spam messages, thereby thwarting attempts by software running on the target system 20 to accurately determine the originator 16 of the spam message(s). Well known viruses capable of creating backdoors in the systems of unsuspecting Internet users include MyDoom, AVF, Sobig, W32.Beagle, and so on. Such backdoors may be exploited by spammers to send spam.

The antispam network 12 includes a first server/client 28, a second server/client 30, and a third server/client 32, which communicate with an antispam controller 34, which is also called a control center. In the present specific embodiment, the controller 34 is implemented via a MailShell server, which may be obtained from MailShell, Inc., the assignee of the present invention. The antispam server/clients 28-32 act as emulators that emulate vulnerable systems, such as the vulnerable systems 22, 24, 26, respectively.

In operation, the spammer 16 desires to anonymously send spam to the target system 20. Accordingly, the spammer 16 searches the Internet 14 for systems 22, 24, 26, which are vulnerable to being hijacked to relay spam or are otherwise usable to relay spam messages. For illustrative purposes, three types of vulnerable systems are shown, namely an open proxy/relay 22, a vulnerable web page form 26, and a virus or worm-infected system 24. Virus or worm-infected systems, which have resources that may be remotely controlled are often called zombies. Upon finding a presumably vulnerable system, such as the open proxy/relay 22, the spammer 16 relays spam messages through the system 22 so that an associated message 36 appears to the target system 20 to have come from the vulnerable system 22 instead of from the actual spammer 16.

The antispam server network 12 and its associated server/clients 28-32, which emulate vulnerable-systems, act as spam traps. When the spammer 16 performs a search of the Internet 14 to locate vulnerable systems, the server/clients 28-32 of the antispam server network 12 may be detected by the spammer 16. When the spammer 16 attempts to relay a spam message 38 to the intended recipient 20 through the first special/client 28, for example, the first server/client 28 intercepts the message and strategically broadcasts replies to the spammer 16 so that the message 38 sent through the first server/client 28 appears to the spammer 16 as having been successfully delivered. However, in the present specific embodiment, the server/client 28 actually intercepts the message, and either archives, deletes, or relays the message to another system, such as the antispam controller 34 for further analysis or handling. Furthermore, the server/client 28 locates or determines the address of the system from which the message 38 was sent and compiles statistics pertaining to messages sent from the particular source 16. These statistics may be forwarded to the antispam controller 34 for further archiving and/or handling. Statistics and other information can be shared globally, among several or many different entities in different systems that can be at separate geographic locations.

Alternatively, the first server/client 28 flags incoming messages from the spammer 16 and then forwards the flagged messages to the target system 20 through the associated ISP 18. The target system 20 may run special email-deletion software 40, which may be downloaded from the antispam controller 34. The email-deletion software 40 scans for flagged messages and automatically deletes them from the target system 20. Alternatively, the email deletion functionality of conventional email programs, such as Outlook Express®, may be employed by the target system 20 to automatically place flagged messages into a deleted-items folder.

Since in many jurisdictions, relaying messages through open proxy systems or other vulnerable systems, is illegal, messages trapped by the server/client vulnerable-system emulators 28-32 of the antispam server network 12 are automatically considered to be spam or spam tests. However, the emulation parameters of the client/server software employed to implement the server/clients 28-32 may be adjusted to intercept email that is not necessarily spam. In these cases, further analysis of the messages is performed, such as by analysis software running on the antispam controller 34 or on the server/clients 28-32, before the messages are blocked or flagged. Various methods for analyzing intercepted messages, including well-known methods may be employed to implement embodiments of the present invention without departing from the scope thereof.

The other server/clients 30, 32 of the antispam network 12 operate similarly to the first server/client 28 in that they trap incoming spam messages, but they emulate different types of compromised systems, i.e., they operate using different emulation modes. In the present embodiment, the emulation modes of the server/clients 28-32 may be changed by users of the software employed to implement the server/clients 28-32.

While the server/clients 28-32 are called server/clients, they act as servers. They are called server/clients, since in the present embodiment, they are so-called client-side servers, i.e., servers running on computer systems that are clients of other servers, such as servers of the ISP 18. Servers alone or combinations of client-side servers and stand-alone servers may be employed to emulate vulnerable systems without departing from the scope of the present invention.

In practice, the server/clients 28-32 may represent volunteer computer systems owned by various Internet users. An Internet user, such as the user of the target system 20, may download the appropriate server/client software from the antispam controller 34 as discussed more fully below. The antispam controller 34 acts as a server that may host an associated website to facilitate downloading the server/client software required to emulate a vulnerable system. When downloaded by the user of the target system 20, the special server/client software enables the target system 20 to become part of the antispam server network 12. The user of the target system 20 may select one or more emulation modes, thereby causing the target system 20 to appear as an open proxy relay, a virus/worm infected system, a vulnerable web page form, etc.

As discussed more fully below, various types of vulnerable systems other than those shown emulated by the antispam server network 12 of FIG. 1 may be emulated by the antispam server network 12 without departing from the scope of the present invention. Those skilled in the art with access to the present teachings may readily implement the various functions discussed herein without undue experimentation.

Figure 2:
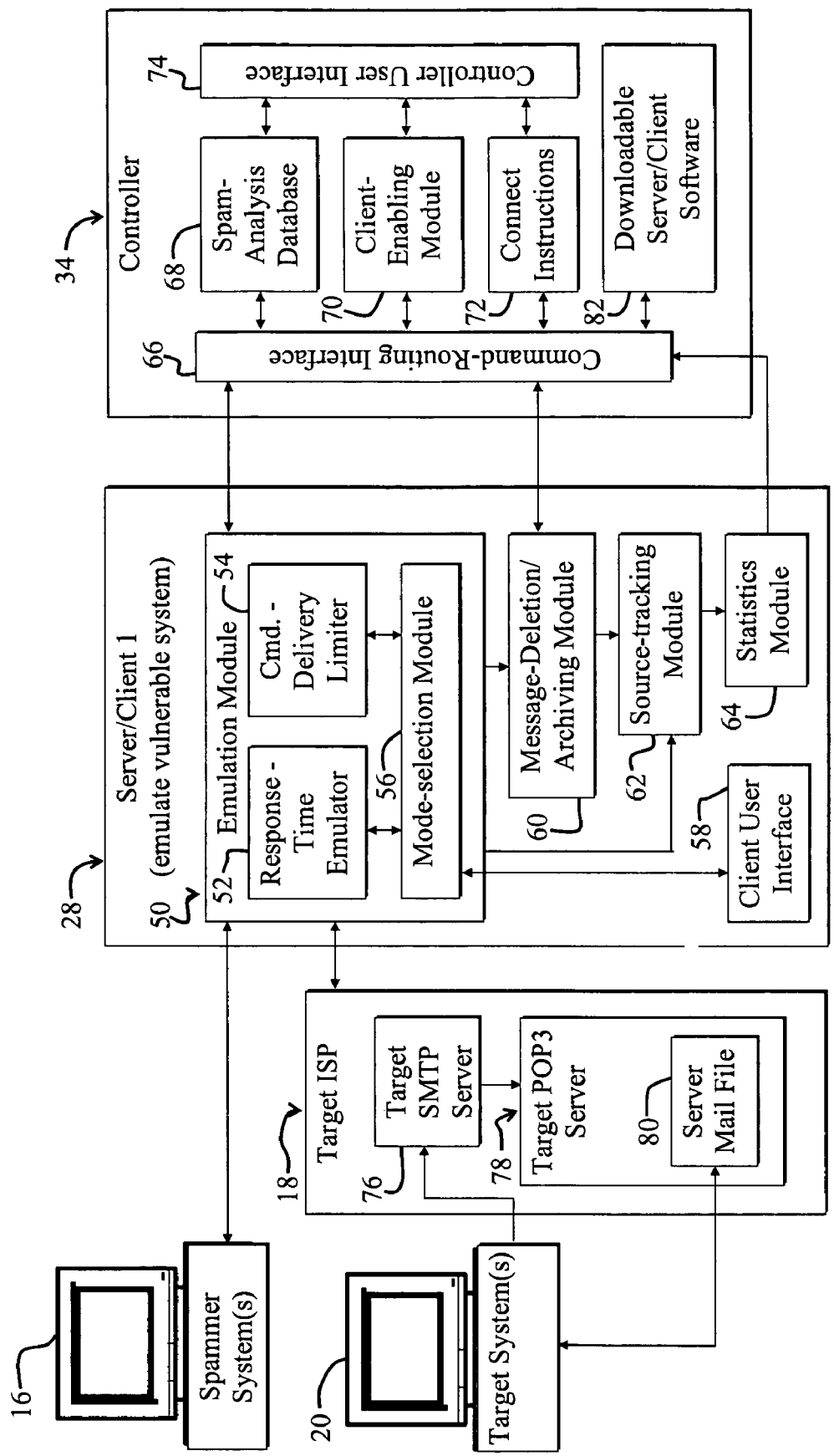
FIG. 2 is a more detailed diagram illustrating functional modules of the first server/client and controller of the antispam server network of the system of FIG. 1.

FIG. 2 is a more detailed diagram illustrating key functional modules of the first server/client 28 and controller 34 of FIG. 1. For clarity, only the first one of the server/clients 28-32 of FIG. 1 is shown in more detail in FIG. 2. However, those skilled in the art with access to the present teachings may readily select and implement modules to implement the other types of server/clients 30, 32 shown in FIG. 1 without undue experimentation.

The first server/client 28 includes an emulation module 50 that includes a message response-time emulation module 52, a command-delivery limiter 54, and a mode-selection module 56. The mode-selection module 56 communicates with the response-time emulation module 52, the command-delivery limiter 54, and a client user interface 58. The first server/client 28 further includes a message-deletion/archiving module 60, which communicates with a message source-tracking module 62, which provides output to a statistics module 64.

The emulation module 50 and the message-deletion/archiving module 60 also communicate with a command-routing interface 66 running on the controller 34. In the present specific embodiment, the controller 34 further includes a spam-analysis database 68, a client-enabling module 70, a connect-instructions module 72, each of which communicate with the command-routing interface 66 and a controller user interface 74. Additional downloadable server/client software 82 is available for download from the controller 34. Internet users wishing to participate in the antispam network 12 of FIG. 1 may download and run the server/client software 82 to participate in the antispam network 12.

The emulation module 50 also communicates with spammer systems 16 to trap outgoing spam messages from the spammer system 16. The server/client 28 appears to the spammer system 16 as a compromised or otherwise vulnerable system that may be employed to relay spam messages to the intended recipient(s) 20. The intended recipient(s), i.e., the target system 20 employs the target ISP 18 to send and receive email messages. In the present specific embodiment, the target ISP 18 includes a Simple Mail Transfer Protocol (SMTP) server 76 in communication with a Post Office Protocol (POP3) server 78. The POP3 server 78 maintains a mail file 80, which is selectively parsed into different constituent email messages as needed upon access by the mail client of the target system 20.

The emulation module 50 may also optionally communicate with the target ISP 18. In this case, the target system 20 may receive flagged spam from the emulation module 50 of the server/client 28, if the server/client 28 is configured to flag and then forward the messages.

In operation, the server/client 28 intercepts span messages from the spammer system 16 via the emulation module 50. The spammer system 16 may attempt to monitor response times from the server/client 28 to verify that the server/client 28 represents a legitimate vulnerable system. If the response times are too short, the spammer may choose another presumably vulnerable server through which to relay spam. To enhance vulnerable-system emulation, the response-time emulation module 52 running on the emulation module 50 selectively delays responses from the emulation module 50 to the spammer system 16 based on the sizes of corresponding incoming messages from the spammer system 16. Parameters other than file sizes that would affect response times of an actual open proxies (see open proxy 22 of FIG. 1) or other vulnerable systems may be employed to accurately emulate response times.

The command-delivery limiter 54 selectively limits the frequency and/or rates at which commands are sent. The sending frequencies may be adjusted by controlling delivery intervals. Such commands may include recipient (RCPT) and verify (VRFY) commands, forwarded by the emulation module to the target system 20 through the target ISP 18. In the present specific embodiment, the server/client 28 strategically forwards some messages to the target system 20 to thwart spammer systems that employ other target systems (called salt systems) to test whether spam is being properly delivered to target systems. The command-delivery limiter 54 selectively limits deliveries of email commands and associated messages, such as those sent from the server/client 28 to the target SMTP server 76 of the Target ISP 18.

The activities of the command-delivery limiter 56 may be adjusted by the mode-selection module 56 in response to input from the client user interface 58. Alternatively, the controller 34 may adjust the operational parameters of the emulation module 50 via commands forwarded from the connect-instructions module 72 to the emulation modulation module 50 via the command-routing interface 66.

The command-routing interface 66 of the controller 34 selectively routes incoming and outgoing communications to/from the client/server 28 to/from the spam-analysis database 68, the client-enabling module 70, and the connect-instructions module 72. The exact details of the command-routing interface 66 are application specific and may be readily determined and implemented by one skilled in the art to meet the needs of a given application. Furthermore, the command-routing interface 66 may be omitted or replaced without departing from the scope of the present invention.

Spam messages intercepted by the emulation module 50 are selectively forwarded to the message-deletion/archiving module 60. The message-deletion/archiving module 60 either blocks the intercepted messages by deleting them, archiving them, and/or forwarding them to an outside entity, such as to the spam-analysis database 68 running on the controller 34. The exact behavior of the message-deletion/archiving module 60 depends on the operational mode, including emulation mode, of the server/client 50. The operational mode may be established via input from the client user interface 58 and/or from the controller 34.

The message-deletion/archiving module 60 may also forward information, such as sender Internet-Protocol (IP) addresses, about intercepted spam to the source-tracking module 62. The source-tracking module 62 may extract and maintain all available details about the sender or source from which the spam message was received. The source-tracking module 62 may obtain additional information directly from the emulation module 50 and not just the source-tracking module 62.

Additional statistics, such as number of spam messages sent from each IP address, are maintained by the statistics module 64. In the present specific embodiment, the statistics module 64 forwards message-interception and spammer statistics to the centralized spam database 68 either periodically or upon request by the controller 34.

The spammer system 16 may employ an ISP similar to the target ISP 18 to send spam. The source-tracking module 62 may readily extract Domain Name Server (DNS) information, IP addresses, and other forge-resistant data associated with the SMTP server through which the spam was sent. Such information is readily available and extractable from standard Internet email messaging. However, conventionally, when this information is extracted, it represents the IP address of a compromised system through which the spam was relayed. Users of server/client traps, such as the server clients 28-32 of FIGS. 1 and 2 of the present invention, are more likely to determine the originator of the spam, since the intercepted spam has been relayed through at least one fewer vulnerable systems.

In the alternative scenario, wherein the emulation module 50 flags spam to facilitate removal by the target system 20, the emulation module 50 forwards the email to the target SMTP server 76. The emulation module 50 may access one or more Domain Name Servers (DNS) to retrieve the domain of the target ISP 18 upon which resides the target SMTP server 76. The SMTP server 76 receives the incoming messages and then forwards them to the POP3 server 78. The POP3 server 78 then adds the received message(s) to the server mail file 80. The server mail file 80 is accessible by the target system 20 upon connection to the POP3 server 78.

The client-enabling module 70 running on the controller 34 is employed to selectively remotely disable or enable the server/client 28. However, this functionality may be omitted from the client-enabling module without departing from the scope of the present invention.

The connect-instructions module 72 forwards control signals to the server/client 28 that affect what information is sent by the server/client 28 and to which entities the server/client 50 connects to transfer information. Various modules of the server/client 28 and the controller 34 may be omitted or regrouped without departing from the scope of the present invention. Furthermore, additional functionality and corresponding modules may be added, such as modules to implement additional user options to control the behavior of the server/client 28.

Software for implementing the various modules of the server/client 28 and controller 34 of FIG. 2 may be purchased through MailShell, Inc. The remaining modules are readily obtainable through conventional hardware and/or software suppliers. The various modules and features of the server/clients 28-32 may be implemented via one or more modules running on the controller 34 without departing from the scope of the present invention.

While the embodiment of FIGS. 1 and 2 show relatively limited numbers of server/clients, target systems, and spammers, embodiments of the present invention may be scaled to any number of participants without departing from the scope of the present invention.

In the present embodiment, the server/clients 28-32 treat all incoming messages as spam or test messages sent by spammers. Alternatively, the email messages received by the server/clients 28-32 may be forwarded to the controller 34 for further analysis. The controller 34 may employ software, to further analyze email messages and to generate further instructions to the server/clients 28-32 specifying whether to block a particular email message and whether to block further incoming messages from the sending system associated with the particular email message. Such analysis software may be implemented via the spam-analysis database 68 of FIG. 2. Alternatively, email analysis to verify whether an email message represents spam may be performed via analysis software running on the server/clients 28-32.

With reference to FIGS. 1-2, in the present specific embodiment, the server/clients 28-32 are implemented via an SMTP server that accepts incoming Internet email messages on Transmission Control Protocol (TCP) port 25 using the SMTP protocol. Unlike conventional SMTP servers, the server/clients 28-32 rarely relay spam to the intended recipient 20. Instead, the server/clients 28-32 save the spam and associated information, which may be used as evidence, to file a complaint, and/or for research.

In the present specific embodiment, the server/clients 28-32 may also implement Hypertext Transfer Protocol (HTTP) services in addition to SMTP services. Such services may be selectively switched on and off via the client user-interface 58 by adjusting appropriate parameters in the mode-selection module 56. Other user-configurable options may be implemented without departing from the scope of the present invention. For example, functionality enable users to control where and how intercepted spam is filed may be implemented in the server/clients 28-32. Additional functionality for reporting spammers to their associated ISPs or filing other types of complaints may be implemented in the software 82 that implements the server/clients 28 and or the controller 34 without departing from the scope of the present invention.

Since a large percentage of spam is sent via open email relays, hacked computers (zombies), open proxies, web forms, and other vulnerable systems, the antispam server network 12 is particularly useful in combating spam. The antispam server network 12 further facilitates collecting relatively accurate information on the behavior of spammer systems.

A spammer may attempt to circumvent spam traps implemented via the antispam server network 12 by testing a large sample of messages, periodically re-testing, searching for a distinct signature of a particular server/client, and/or by spreading a spam attack among a large number of servers. Antispam server networks according to embodiments of the present invention may circumvent or avoid such attempts by spammers by employing very large network of server/clients; by transparently emulating open proxies, open relays, virus-infected machines, hacked machines, and so on; by analyzing network traffic flow to facilitate identifying spammers.

In one embodiment, the server/clients 28-32 of the antispam server network 12 do not necessarily always block incoming messages. For example, the emulation module 50 may inspect and analyze incoming messages to determine if they are test messages sent by a spammer. If the incoming messages are test messages, they may be relayed to the intended recipients of the spam. Various methods for testing whether a message is spam or a spam test message, including well-known methods, may be employed for the purposes of the present invention without departing from the scope thereof. A message is considered to be most likely spam if the message was sent from a server in a blacklist; the message arrives too soon after another message; the message has too many recipients, where the meanings of the phrases too soon and too many are configurable by a user via the client user interface 58.

Furthermore, the server/clients 28-32 are typically configured to relay email to any email addresses that are known relay-test drop boxes. This occurs even if a given email messages has already been determined to be spam in a previous test. An email address is treated as a drop-box address if it has appeared as a recipient of a relay-test. The server/clients 28-32 may be configured to never relay email messages and instead block all intercepted messages, without departing from the scope of the present invention.

With reference to FIG. 2, a user may employ the client user interface 58 to set operational parameters of the emulation module 50. In the present embodiment, such operational parameters include how much network bandwidth is allotted for the antispam server network 12; which type of emulation(s) will be performed by the emulation module 50; when the server/client 28 should be active, such as the time of day, time of the week, when the user is inactive, and so on; the total number of proxied connections allowed at a given time or during a given time frame; the number of connections that will be simultaneously kept alive; the rate at which SMTP RCPT and VRFY commands are sent to target SMTP servers, and so on. Additional controllable parameters include parameters specifying how the server clients 28-32 send data. An operator of the antispam controller 34 may control such parameters if needed for a particular implementation.

Additional functions of the server/clients 28-32 may include providing statistics as to the number of spam attacks intercepted; the number of spam messages blocked; historical patterns, and so on. Such data may be displayed via the client user interface 58 and/or the controller user interface 74, which may be implemented via Graphical User Interface (GUI) software.

The server/clients 28-32 may also implement so-called tar pits, which act to slow down a given spammer server by selectively lengthening response times from the server/client 28-32 that is currently communicating with the spammer system 16. Use of tar pits so slow response times by a user-configurable amount may reduce the resources of the spammer systems 16 and may reduce the resources, such as disk space, required by the server/clients 28-32 since spam arrives at the server/clients 28-32 more slowly.

The server/clients 28-32 may further include functionality and corresponding module(s) to facilitate publication of the server/client location in public open-relay lists and directories to help spammers locate and attempt to employ the server clients 28-32 to send spam.

A user of one of the server clients 28-32, such as the server/client 28, may employ the client user interface 58 to adjust parameters of the mode-selection module that specify how many successful attempts a spammer is allowed before future spam is blocked. This helps to thwart spammers that send themselves test messages before sending a batch of spam messages.

Similarly, a user may employ the client user interface 58 and corresponding mode-selection module 56 so set parameters that determine the consistency and frequency of responses sent by the client server 28 to the spammer system 16. This helps thwart spammers 16 that periodically test the success of a spam run during the spam run.

Hence, user is afforded much control over resources used by the accompanying computer system, while ensuring that their server resources appear real and remain undetectable by a spammer. Further client/server software updates may be downloaded from the controller 34 as needed.

In the present embodiment, the server/clients 28-32 collect various types of available data about senders of the intercepted spam, which may be stored in various locations, such as the source-tracking module 62 and/or the spam database 68 running on the controller 34. This information may be employed to analyze spam traffic flow and to extract spam content, spam tricks, spam Uniform Resource Locators (URLs), spam routing methods, and so on. The server/clients 28-32 are particularly useful for extracting and maintaining forge-resistant data, i.e., data that is relatively resistant to forgery, such as message content, connection time, IP addresses URL fragments, phone numbers, email addresses, message fingerprints, attachment fingerprints, message bulkiness, and so on. Other types of data, such as viewable data may be extracted and maintained by the server/clients 28-32. Viewable data includes data such as words or phrases in From, To, Subject, and Body fields; frequencies associated with word hits and rule hits and so on. The server/clients 28-32 may employ the forge-resistant data to trace additional information, including the name of the owner of particular IP addresses, the physical locations of IP addresses, owners of domain names, domain registrars, domain name servers, spider web pages of URLs, mail server banners, and so on. Those skilled in the art with access to the present teachings may implement such functionality without undue experimentation.

With reference to FIGS. 1 and 2, in an illustrative implementation, the emulation module 50 further-implements a mechanism for actively searching the Internet 14 for other vulnerable systems outside of the antispam server network 12. Information pertaining to discovered vulnerable systems, such as numbers and types of vulnerable systems discovered, may be forwarded to the spam-analysis database 68 of the controller 34 via the statistics module 64 of the server/client 28 for further analysis. Additional routines running on the server/client 28 may be employed to render discovered vulnerable systems unusable to relay spam. Such additional routines may be developed by those skilled in the art with access to the present teachings without undue experimentation, or they may be ordered from MailShell, Inc.

While embodiments disclosed herein employ relatively centralized control of the antispam server network 12, decentralized control may be employed without departing from the scope of the present invention. In such an alternative implementation, various functions of the controller 34 could be distributed and shared between the different client/servers 28-32 of the antispam server network 12. Alternatively, each client/server 28-32 is independently controlled by antispam control software running on the client/servers 28-32. Alternatively, a combination of centralized control and decentralized control may be employed without departing from the scope of the present invention.

Figure 3:
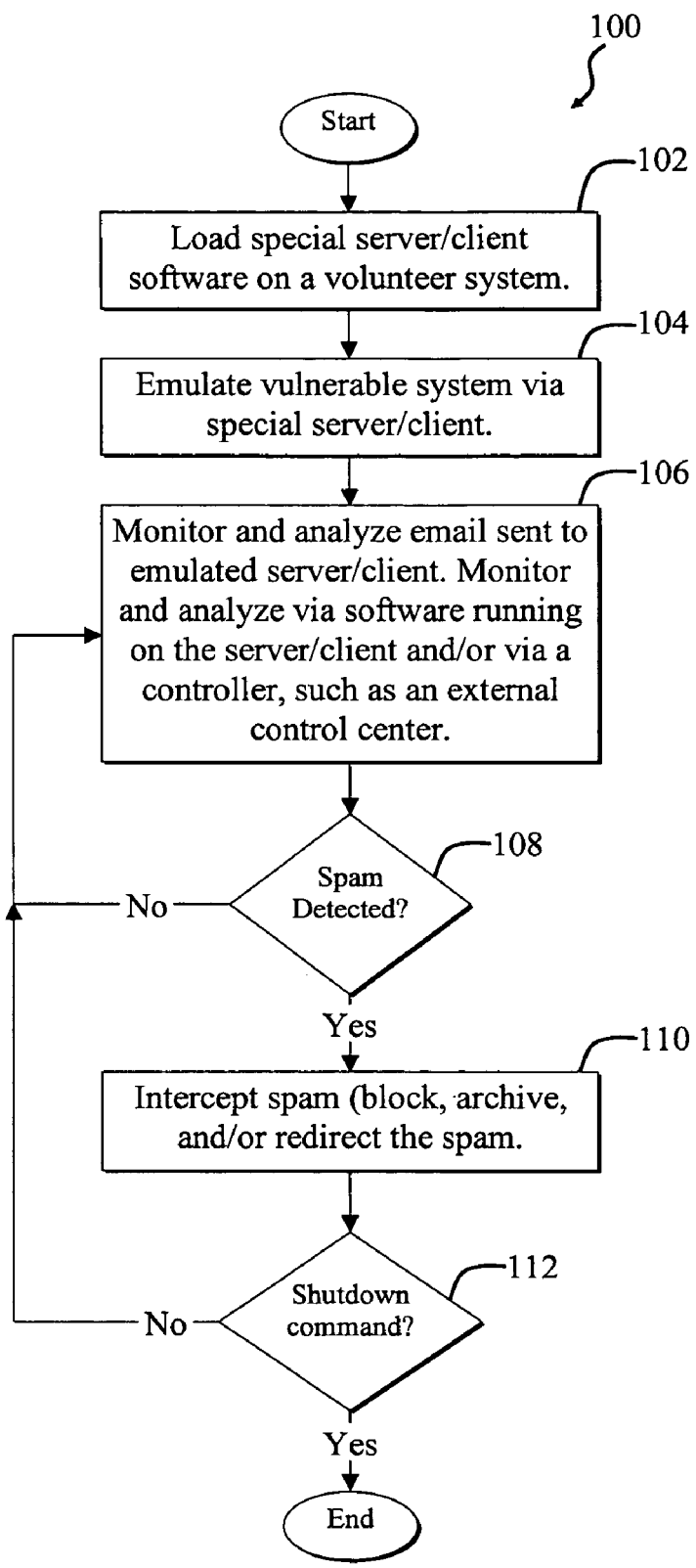
FIG. 3 is a flow diagram of an exemplary method implemented by the system of FIG. 1.

FIG. 3 is a flow diagram of an exemplary method 100 implemented by the antispam server network 12 of the system 10 FIG. 1. With reference to FIGS. 1-3, the method 100 includes an initial loading step 102, wherein special client/server software for implementing the client/servers 28, 20, 32 is loaded on to a computer system, such as a volunteer system. The software includes various modules, such as the emulation module 50, source-tracking module 62, and statistics module 64 shown in FIG. 2 used by the client/servers 28, 20, 32 to transparently emulate a compromised system, an open proxy, a vulnerable web page form and/or other vulnerable system. A volunteer wishing to participate in intercepting spam may join the antispam network by downloading the appropriate software from the controller 34 via the Internet 14. For example, the user of the target system 20 may decide to join the antispam network 12 after receiving spam from the spammer system 16.

This ability of Internet users to easily join the antispam server network 12 promotes the proliferation of the spam traps that are implemented by participating systems of the antispam server network 12. Hence, the antispam network 12 will increasingly contribute to the overall suppression of spam as the antispam network 12 grows.

Unlike conventional antispam systems, the antispam network 12 accumulates more accurate information about potential spammers. This yields a particularly synergistic beneficial result. Namely, spammer information, which may be stored in the spam-analysis database 68 of the controller 34, may facilitate prosecution of illegal spammers by law enforcement, which thereby further inhibits spam.

In a subsequent emulation step 104, the software loaded in the initial loading step 102 is employed to emulate one or more vulnerable systems that might be used by an illegal spammer. The loaded software represents one of the server/clients 28-32 of the antispam network 12 of FIG. 1.

In a subsequent monitoring step 106, the loaded software monitors and analyzes email intercepted by the associated server client 28, 30, and/or 32. Alternatively, intercepted email is forwarded to the antispam controller 34 for further analysis. Alternatively, all intercepted email is considered to be spam.

If spam is detected in the monitoring step 106, then a blocking step 110 is performed. Otherwise, the monitoring step continues 106. The blocking step 110 includes blocking, archiving, redirecting, or flagging and forwarding the intercepted spam. The method 100 continues unless a shutdown command is detected in a shutdown-checking step 112.

The order of the various steps 102-112 of the method 100 may be changed, and some steps may be omitted or modified without departing from the scope of the present invention. For example, the monitoring step 106 may be omitted or otherwise implemented in the spam-detection Variations and embodiments other than those discussed herein are possible. For example, embodiments employing the Internet or other packet switched networks; embodiments employing protocols other than SIP, and embodiments employing video calls, file transfers, conference calls, and so on are possible.

Although embodiments of the invention are discussed primarily with respect to server-client architecture, any acceptable architecture, topology, protocols, or other network and digital processing features can be employed. In general, the servers and/or server/clients 28-34 can be implemented via any device with processing ability or other requisite functionality. For example, some of the functions described herein can be performed with devices that are considered clients, such as a user computer system. It is also possible that functionality relevant to embodiments of the present invention can be included in a router, switch, storage device or other device.

Although processes of the present invention, and the hardware executing the processes, may be characterized by language common to a discussion of the Internet (e.g., "client," "server," "peer") it should be apparent that operations of the present invention can execute on any type of suitable hardware in any communication relationship to another device on any type of link or network.

Although a process of the present invention, may be presented as a single entity, such as software executing on a single machine, such software is readily able to be executed on multiple machines. That is, there may be multiple instances of a given software program, a single program may be executing on two or more processors in a distributed processing environment, parts of a single program may be executing on different physical machines, etc. Further, two different programs, such as a client and server program, can be executing in a single machine, or in different machines. A single program can be operating as a client for one information transaction and as a server for a different information transaction.

Any type of processing device can be used to send and receive email. For example, portable computing devices such as a personal digital assistant (PDA), cell phone, laptop computer, or other devices can be employed. In general, the devices and manner of specific processing (including location and timing) are not critical to practicing important features of the present invention.

Although embodiments of the present invention are discussed primarily with respect to email transferred over the Internet, any suitable network, network topology, transmission protocols, sender-receiver devices and relationships, and other characteristics or properties of electronic devices, processes and transmission methods can be used. For example, features of the invention can be employed on a smaller scale to local area networks (LANs), campus or corporate networks, home networks, etc.

Although the invention has been discussed with respect to specific embodiments thereof, these embodiments are merely illustrative, and not restrictive, of the invention. For example, although specific protocols have been used to describe embodiments, other embodiments can use other transmission protocols or standards. Use of the terms "client" and "server" can include any type of device, operation or other process. The present invention can operate between any two processes or entities including users, devices, functional systems or combinations of hardware and software. Peer-to-peer networks and any other networks or systems where the roles of client and server are switched, change dynamically, or are not even present are within the scope of the invention.

Any suitable programming language can be used to implement the routines or other instructions employed by various network entities. Exemplary programming languages include C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "machine-readable medium" or "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed or networked systems, components, and/or circuits can be used. Communication, or transfer of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow "a", "an", and "the" include plural references unless the context clearly dictates otherwise. Furthermore, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A system for inhibiting or suppressing delivery of undesirable email messages through vulnerable systems comprising:
   an emulator that emulates one or more vulnerable systems that can be used by spammers to relay, forward or otherwise send undesirable email messages to target systems; and
   a module associated with the emulator, the module configured to
      intercept undesirable email messages that spammers attempt to relay, forward or otherwise send to target systems using one or more of the emulated one or more vulnerable systems, and
      send replies back to spammers, in response to spammers' attempts to relay, forward or otherwise send undesirable email messages to target systems using one or more of the emulated one or more vulnerable systems,
      wherein at least a majority of intercepted undesirable email messages are prevented from ever being relayed, forwarded or otherwise sent to target systems using one or more of the emulated one or more vulnerable systems, and
      wherein, in order to make it appear to spammers that undesirable email messages are successfully being relayed, forwarded or other sent to target systems, the replies sent back to spammers emulate what the spammers would expect to receive had the intercepted undesirable email messages been successfully relayed, forwarded or otherwise sent using one or more of the emulated one or more vulnerable systems, even though at least a majority of the intercepted undesirable email messages are never relayed, forwarded or otherwise sent to target systems.

2. The system of claim 1 wherein the system further includes plural emulators, the plural emulators including one or more servers.

3. The system of claim 2 wherein the one or more servers are part of a network of servers.

4. The system of claim 3 further including a controller in communication with one or more servers of the network of servers.

5. The system of claim 4 wherein the controller includes a database configured to store statistics pertaining to undesirable email messages intercepted by one or more of the servers.

6. The system of claim 5 wherein the statistics include data pertaining to a sender of the undesirable email messages.

7. The system of claim 4 wherein elements of the network of servers are interconnected via the Internet.

8. The system of claim 1 wherein the undesirable email messages include spam.

9. The system of claim 1 wherein the emulator further includes
a response-time emulation mechanism that adjusts emulator response times, for sending the replies back to spammers, based on the lengths or sizes of the intercepted messages.

10. The system of claim 9 wherein the emulator further includes
a command-delivery limiter that limits rates or sending intervals at which predetermined commands bound for a target email server are sent.

11. The system of claim 10 wherein the predetermined commands include recipient (RCPT) and verify (VRFY) Simple Mail Transport Protocol (SMPT) commands.

12. The system of claim 9 wherein the emulator further includes
a mechanism that selectively further delays messages sent by the emulator in response to intercepted email communications.

13. The system of claim 1 wherein the module includes
a message deletion/archiving module configured to delete, archive, or forward intercepted email messages.

14. The system of claim 1 wherein the emulator further includes
a mode-selection module in communication with a user interface, the mode-selection module facilitating switching emulation modes of the emulator.

15. The system of claim 14 wherein the emulation modes include one or more of the following:
open proxy emulation;
open relay emulation;
virus or worm-infected system emulation; and/or
vulnerable web form emulation.

16. The system of claim 1, wherein the module is also configured analyze the intercepted undesirable email messages, and to communicate results of the analysis to one or more further systems to inhibit the one or more further systems from relaying, forwarding or otherwise sending the undesirable email messages to target systems;
wherein the results of the analysis include information about undesirable email messages, other than or in additional to information about sending addresses from which undesirable email messages originate, so that the information would enable undesirable email messages to be identified as undesirable by the one or more further systems even if the one or more further systems received the undesirable email messages from different sending addresses.

17. The system of claim 1, wherein the module is also configured to relay the intercepted undesirable email messages to an antispam controller that analyzes the intercepted undesirable email messages, and communicates results of the analysis to one or more further systems to inhibit the one or more further systems from relaying, forwarding or otherwise sending the undesirable email messages to target systems;
wherein the results of the analysis include information about undesirable email messages, other than or in additional to information about sending addresses from which undesirable email messages originate, so that the information would enable undesirable email messages to be identified as undesirable by the one or more further systems even if the one or more further systems received the undesirable email messages from different sending addresses.

18. The system of claim 1, wherein the module is configured to relay, forward or otherwise send a minority of intercepted undesirable email messages to at least some target systems, just in case spammers test whether undesirable email messages are being successfully relayed, forwarded or otherwise sent to target systems.

19. The system of claim 1, wherein the module is configured to:
determine whether incoming messages are relay test messages sent by spammers; and
cause the relaying, to target systems, of incoming messages that are determined to be relay test messages.

20. The system of claim 1, wherein the module is configured to:
determine whether incoming messages are addressed to known relay-test drop boxes; and
cause the relaying, to known relay-test drop boxes, of messages that are determined to be addressed to known relay-test drop boxes.

21. The system of claim 1, wherein the emulator treats all incoming email messages as undesirable email messages.

22. The system of claim 1, further comprising:
a subsystem, associated with or in communication with the emulator, the subsystem configured to:
analyze email messages to determine whether email messages are undesirable email messages that should be blocked; and
inform the emulator when email messages should be blocked.

23. A system for inhibiting or suppressing delivery of undesirable email messages through vulnerable systems, comprising:
an emulator that emulates one or more of the vulnerable systems that can be used by spammers to relay, forward or otherwise send undesirable email messages to target systems; and
a module associated with the emulator, the module configured to
intercept undesirable email messages that spammers attempt to relay, forward or otherwise send to target systems using one or more of the emulated one or more vulnerable systems, and
forward information about the undesirable email messages and/or about systems from which the undesirable email messages are sent, to one or more further systems, so that the one or more further systems can recognize certain email messages as being undesirable;
wherein the information about undesirable email messages and/or about systems from which the undesirable email messages are sent, comprises information other than or in additional to information about sending addresses from which undesirable email messages originate, so that the information would enable undesirable email messages to be identified as undesirable by the one or more further systems even if the one or more further systems received the undesirable email messages from different sending addresses.

24. The system of claim 23, wherein the one or more further systems comprise one or more target systems.

25. The system of claim 24, wherein the one or more target systems, when they recognize certain email messages as being undesirable based on the information forwarded by the module, automatically delete the undesirable email messages, automatically relay the undesirable email messages and/or automatically put the undesirable email messages in a specific email folder.

26. The system of claim 24, wherein:
the module is configured to flag the intercepted undesirable email messages; and
the information about the undesirable email messages, which is forwarded to the one or more target systems, comprises the flagged email messages.

27. The system of claim 23, wherein the one or more further systems comprise an antispam controller.

28. The system of claim 27, wherein the antispam controller can communicate the information to one or more additional systems to inhibit the one or more additional systems from relaying, forwarding or otherwise sending the undesirable email messages.

29. The system of claim 28, wherein:
the module is configured to flag the intercepted undesirable email messages; and
the information about the undesirable email messages, which is forwarded to the antispam controller, comprises the flagged email messages.

30. The system of claim 23, wherein the module is configured to forward the information about the undesirable email messages and/or about systems from which the undesirable email messages are sent, to the one or more further systems, directly or through one or more intermediary systems.

31. A method for inhibiting or suppressing delivery of undesirable email messages through vulnerable systems, comprising:
emulating one or more vulnerable systems that can be used by spammers to relay, forward or otherwise send undesirable email messages to target systems;
intercepting undesirable email messages that spammers attempt to relay, forward or otherwise send to target systems using one or more of the one or more vulnerable systems being emulated; and
forwarding information about the undesirable email messages and/or about systems from which the undesirable email messages are sent, to one or more further systems, so that the one or more further systems can recognize certain email messages as being undesirable;
wherein the information about undesirable email messages and/or about systems from which the undesirable email messages are sent, comprises information other than or in additional to information about sending addresses from which undesirable email messages originate, so that the information would enable undesirable email messages to be identified as undesirable by the one or more further systems even if the one or more further systems received the undesirable email messages from different sending addresses.

32. The method of claim 31, further comprising flagging the intercepted undesirable email messages, and wherein the information about the undesirable email messages, which is forwarded, comprise the flagged email messages.

33. The method of claim 16, wherein the forwarding the information about the undesirable email messages and/or about systems from which the undesirable email messages are sent, to the one or more further systems, can be performed directly or through one or more intermediary systems.

34. A method for inhibiting or suppressing delivery of undesirable email messages through vulnerable systems comprising:
emulating one or more vulnerable systems that can be used by spammers to relay, forward or otherwise send undesirable email messages to target systems;
intercepting undesirable email messages that spammers attempt to relay, forward or otherwise send to target systems using one or more of the emulated one or more vulnerable systems, and
sending replies back to spammers, in response to spammers' attempts to relay, forward or otherwise send undesirable email messages to target systems using one or more of the emulated one or more vulnerable systems; and
preventing at least a majority of the intercepted undesirable email messages from ever being relayed, forwarded or otherwise sent to target systems using one or more of the one or more vulnerable systems being emulated;
wherein, in order to make it appear to spammers that undesirable email messages are successfully being relayed, forwarded or other sent to target systems, the replies sent back to spammers emulate what the spammers would expect to receive had the intercepted undesirable email messages been successfully relayed, forwarded or otherwise sent using one or more of the emulated one or more vulnerable systems, even though at least a majority of the intercepted undesirable email messages are never relayed, forwarded or otherwise sent to target systems.

35. The method of claim 34, further comprising adjusting response times, for sending the replies back to spammers, based on the lengths or sizes of the intercepted messages.

36. The method of claim 34, further comprising:
analyzing intercepted undesirable email messages; and
communicating results of the analyzing to one or more further systems to inhibit the one or more further systems from relaying, forwarding or otherwise sending the undesirable email messages;
wherein the results of the analyzing include information about undesirable email messages, other than or in additional to information about sending addresses from which undesirable email messages originate, so that the information would enable undesirable email messages to be identified as undesirable by the one or more further systems even if the one or more further systems received the undesirable email messages from different sending addresses.

37. The method of claim 34, further comprising:
relaying intercepted undesirable email messages to an antispam controller that analyzes the intercepted undesirable email messages, and communicates results of the analysis to one or more further systems to inhibit the one or more further systems from relaying, forwarding or otherwise sending the undesirable email messages;
wherein the results of the analysis include information about undesirable email messages, other than or in additional to information about sending addresses from which undesirable email messages originate, so that the information would enable undesirable email messages to be identified as undesirable by the one or more further systems even if the one or more further systems received the undesirable email messages from different sending addresses.

38. The method of claim 34, further comprising relaying, forwarding or otherwise sending a minority of intercepted undesirable email messages to at least some target systems, just in case spammers test whether undesirable email messages are being successfully relayed, forwarded or otherwise sent to target systems.

39. The method of claim 34, further comprising:

determining whether incoming messages are relay test messages sent by spammers; and causing the relaying, to target systems, of incoming messages that are determined to be relay test messages.

40. The method of claim 34, further comprising:

determining whether incoming messages are addressed to known relay-test drop boxes; and causing the relaying, to known relay-test drop boxes, of messages that are determined to be addressed to known relay-test drop boxes.

41. The method of claim 34, further comprising:

treating, as undesirable email messages, all email messages received by the one or more vulnerable systems being emulated.

42. The method of claim 34, further comprising:

analyzing email messages, received by the one or more vulnerable systems being emulated, to determine whether email messages are undesirable email messages that should be blocked; and informing, the one or more vulnerable systems being emulated, when email messages should be blocked.

\* \* \* \* \*

UNITED STATES PATENT AND TRADEMARK OFFICE
CERTIFICATE OF CORRECTION

| | | |
|---|---|---|
| PATENT NO. | : 7,631,044 B2 | Page 1 of 1 |
| APPLICATION NO. | : 11/077384 | |
| DATED | : December 8, 2009 | |
| INVENTOR(S) | : Tony Yu | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1123 days.

Signed and Sealed this

Second Day of November, 2010

David J. Kappos
*Director of the United States Patent and Trademark Office*